(12) United States Patent
Lim

(10) Patent No.: US 9,584,392 B2
(45) Date of Patent: Feb. 28, 2017

(54) METHOD AND APPARATUS FOR MANAGING SEGMENTS CONNECTED VIA NETWORK

(71) Applicant: Electronics and Telecommunications Research Institute, Daejeon (KR)

(72) Inventor: Chang Gyu Lim, Daejeon (KR)

(73) Assignee: Electronics Telecommunications Research Institute, Daejeon (KR)

( * ) Notice: Subject to any disclaimer, the term of this patent is extended or adjusted under 35 U.S.C. 154(b) by 86 days.

(21) Appl. No.: 14/603,911

(22) Filed: Jan. 23, 2015

(65) Prior Publication Data

US 2015/0215189 A1  Jul. 30, 2015

(30) Foreign Application Priority Data

Jan. 24, 2014  (KR) .................. 10-2014-0008853

(51) Int. Cl.
*H04L 12/28* (2006.01)
*H04L 12/26* (2006.01)
*H04L 12/18* (2006.01)
*H04L 12/46* (2006.01)

(52) U.S. Cl.
CPC ........... *H04L 43/10* (2013.01); *H04L 12/1863* (2013.01); *H04L 12/4633* (2013.01); *H04L 12/4641* (2013.01)

(58) Field of Classification Search
CPC .. H04L 12/66; H04L 43/0811; H04L 12/2697; H04L 46/16; H04L 43/50; H04L 48/28; H04L 45/22; H04L 45/16; H04L 12/185; H04J 3/14

See application file for complete search history.

(56) References Cited

U.S. PATENT DOCUMENTS

| | | | | |
|---|---|---|---|---|
| 6,915,436 B1* | 7/2005 | Booth, III | ............... | G06F 21/42 709/223 |
| 7,940,695 B1* | 5/2011 | Bahadur | ............. | H04L 43/0811 370/254 |
| 9,015,471 B2* | 4/2015 | Haney | ................. | H04L 12/4633 370/395.21 |
| 9,071,514 B1* | 6/2015 | Hegde | ................. | H04L 41/0668 |
| 2002/0046348 A1* | 4/2002 | Brustoloni | ........ | H04L 29/12367 726/6 |
| 2004/0213160 A1* | 10/2004 | Regan | ................. | H04L 12/2602 370/248 |
| 2005/0216942 A1* | 9/2005 | Barton | ............... | H04N 7/17318 725/97 |

(Continued)

FOREIGN PATENT DOCUMENTS

KR  1020130080720 A  7/2013

OTHER PUBLICATIONS

P. Jain et al., Detecting VXLAN Segment Failure, Jun. 2013.

*Primary Examiner* — Andrew Lee
(74) *Attorney, Agent, or Firm* — William Park & Associates Ltd.

(57) ABSTRACT

Provided is a method and apparatus that may generate a ping packet, transmit the generated ping packet to at least one tunnel end point (TEP), receive a response ping packet from each of the at least one TEP in response to the ping packet, and update information on a state of at least one segment connected to each of the at least one TEP based on the received response ping packet.

18 Claims, 12 Drawing Sheets

(56) References Cited

U.S. PATENT DOCUMENTS

| | | | |
|---|---|---|---|
| 2007/0076616 A1* | 4/2007 | Ngo | H04L 12/2697 370/241 |
| 2007/0223456 A1* | 9/2007 | Maruyama | H04L 12/66 370/352 |
| 2008/0089330 A1* | 4/2008 | Ballantyne | H04L 41/12 370/390 |
| 2009/0116396 A1* | 5/2009 | Regan | H04L 43/0811 370/248 |
| 2009/0232138 A1* | 9/2009 | Gobara | H04L 12/66 370/392 |
| 2013/0156035 A1 | 6/2013 | Lim et al. | |
| 2014/0351396 A1* | 11/2014 | Stabile | H04L 41/044 709/223 |

* cited by examiner

METHOD AND APPARATUS FOR MANAGING SEGMENTS CONNECTED VIA NETWORK

CROSS-REFERENCE TO RELATED APPLICATION

This application claims the benefit of Korean Patent Application No. 10-2014-0008853, filed on Jan. 24, 2014, in the Korean Intellectual Property Office, the disclosure of which is incorporated herein by reference.

BACKGROUND

1. Field of the Invention

Embodiments of the present invention relate to a method and apparatus for managing segments connected via a network, and more particularly, to a method and apparatus that may manage segments connected via a network by transmitting and receiving a ping packet through multicasting.

2. Description of the Related Art

In a virtual extensible local area network (VXLAN) environment, a VXLAN ping packet may be transmitted and received between VXLAN tunnel end points (VTEPs) connected to segments to monitor and manage states of the segments connected via a network.

A VTEP receiving a ping packet may determine current states of segments connected to the VTEP, and transmit a response ping packet to a VTEP transmitting the ping packet. In a method according to a related art, when N members are present in a system of the VXLAN environment, 2N(N−1) traffic may be periodically provided and processed in a layer 3 (L3) network in order for each VTEP to verify states of the other VTEPs, which may place a great burden on the L3 network.

Accordingly, a method and apparatus that may efficiently manage and monitor segments in a VXLAN environment while reducing a burden on an L3 network will be described hereinafter.

The foregoing is provided for better understanding, may include contents not forming a portion of a related art, and not include contents suggested by a related art to those skilled in the art.

SUMMARY

An aspect of the present invention provides a method and apparatus that may transmit a ping packet from a representative tunnel end point (TEP), selected from among a plurality of TEPs, to member TEPs, receive response ping packets from the member TEPs to the representative TEP, and update information on a state of at least one segment connected to each of the plurality of TEPs.

Another aspect of the present invention also provides a method and apparatus that may receive a ping packet from another TEP through multicasting, update information on a state of at least one segment connected to the other TEP based on the received ping packet, and transmit a response ping packet to the other TEP based on a message type of the received ping packet.

According to an aspect of the present invention, there is provided a method of managing a segment, the method performed by a TEP selected from among a plurality of TEPs as a representative TEP, the method including generating a ping packet, transmitting the generated ping packet to at least one TEP connected to the representative TEP via a network, receiving a response ping packet from each of the at least one TEP in response to the transmitted ping packet, and updating information on a state of at least one segment connected to each of the at least one TEP based on the received response ping packet.

The generating may include generating the ping packet at a predetermined time interval.

The transmitting and the receiving may be iteratively performed each time the ping packet is generated at the predetermined time interval.

The transmitting may include setting a multicast address assigned to the at least one segment as a target Internet Protocol (IP) of the ping packet.

The transmitting may include transmitting the ping packet to at least one TEP connected to the at least one segment through a multicast tunnel using the set target IP.

The receiving may include receiving the response ping packet from each of the at least one TEP connected to the at least one segment through the multicast tunnel.

The multicast address may be used as a target IP of the response ping packet.

The received response ping packet may include information regarding whether the state of the at least one segment connected to each of the at least one TEP is normal.

The updating may include identifying a TEP indicated by a source IP of the received response ping packet, among the at least one TEP.

The updating may include updating information on an existing state of the identified TEP.

The receiving may include sequentially receiving the response ping packet from each of the at least one TEP in response to the ping packet.

The receiving may include setting a response time limit for reception of the response ping packet.

The receiving may include receiving the response ping packet from each of the at least one TEP within the set response time limit.

A message type of the ping packet may differ from a message type of the response ping packet.

According to another aspect of the present invention, there is also provided a method of managing a segment, the method performed by a TEP, the method including receiving a ping packet from another TEP connected to the TEP via a network, updating, based on the received response ping packet, information on a state of at least one segment connected to the other TEP indicated by a source IP of the received ping packet, and transmitting a response ping packet to the other TEP in response to the received ping packet when a message type of the received ping packet corresponds to a request type.

The receiving may include receiving the ping packet from the other TEP through a multicast tunnel.

The transmitting may include setting a multicast address of the received ping packet as a target IP of the response ping packet.

The transmitting may include transmitting the response ping packet to the other TEP through a multicast tunnel using the set target IP.

The received ping packet may include information regarding whether the state of the at least one segment connected to the other TEP is normal.

The response ping packet may include information regarding whether a state of at least one segment connected to the TEP is normal.

A message type of the response ping packet may correspond to a response type differing from the request type.

The receiving may include receiving the ping packet at a predetermined time interval.

The updating may include identifying the other TEP indicated by the source IP of the received ping packet.

The updating may include updating information on an existing state of the identified other TEP.

According to still another aspect of the present invention, there is also provided a TEP including a ping packet transmission processor to generate a ping packet and transmit the generated ping packet to at least one TEP connected to the TEP via a network, a ping packet reception processor to transmit a response ping packet from each of the at least one TEP in response to the ping packet, and a state manager to update information on a state of at least one segment connected to each of the at least one TEP based on the received response ping packet. The TEP may be selected from among a plurality of TEPs as a representative TEP.

The TEP may further include an address manager.

The ping packet transmission processor may set a multicast address assigned to the at least one segment in the address manager as a target IP of the ping packet.

The ping packet transmission processor may transmit the ping packet to at least one TEP connected to the at least one segment through a multicast tunnel using the set target IP.

The ping packet reception processor may receive the response ping packet from each of the at least one TEP connected to the at least one segment through the multicast tunnel.

The multicast address may be used as a target IP of the response ping packet.

The state manager may identify a TEP indicated by a source IP of the received response ping packet, among the at least one TEP.

The state manager may update information on an existing state of the identified TEP.

The TEP may further include a transmission-reception timer.

The transmission-reception timer may determine a response time limit for reception of the response ping packet.

The ping packet reception processor may sequentially receive the response ping packet from each of the at least one TEP in response to the ping packet.

The ping packet reception processor may receive the response ping packet from each of the at least one TEP within the determined response time limit.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
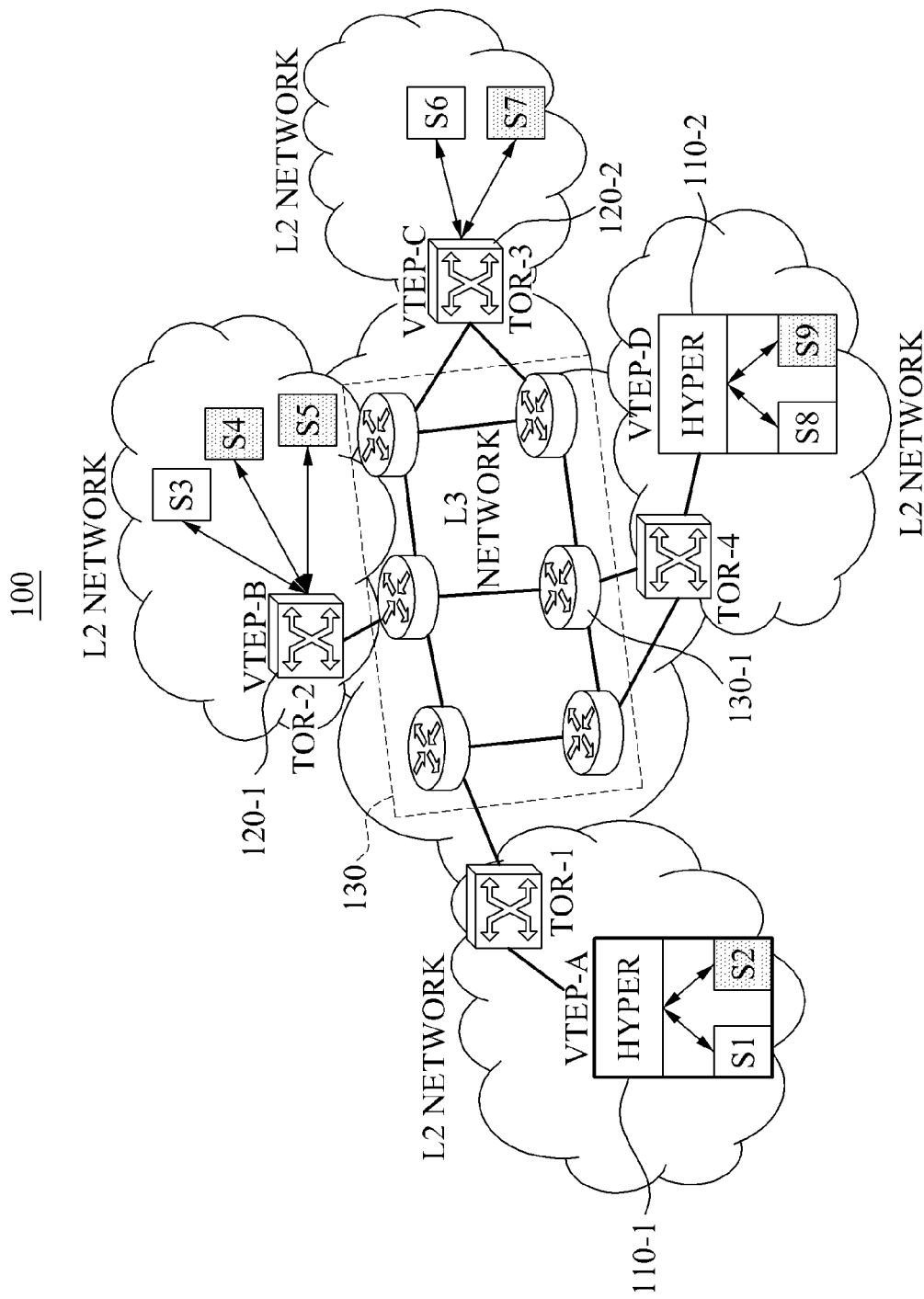
FIG. 1 is a diagram illustrating a system including a representative tunnel end point (TEP) and member TEPs according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a system 100 including a representative tunnel end point (TEP) and member TEPs according to an embodiment of the present invention.

The system 100 may include a plurality of TEPs. Each of the plurality of TEPs of the system 100 may be connected to at least one segment via a network.

Referring to FIG. 1, the system 100 may include four TEPs. The TEPs included in the system 100 may be connected to one another via a network. The network may be based on a virtual local area network (VLAN) or a virtual extensible local area network (VXLAN). For example, each of the TEPs included in the system 100 may correspond to a VXLAN TEP (VTEP).

Segments connected to each of VTEPs, for example, VTEP-A, VTEP-B, VTEP-C, and VTEP-D, included in the system 100 may have VXLAN network identifiers (VNIs). For example, segments S1, S3, S6, and S8 among segments S1 through S9 may have an identical VNI. Remaining segments S2, S4, S5, S7, and S9 may have an identical VNI. The VNI of the segments S1, S3, S6, and S8 may differ from the VNI of the segments S2, S4, S5, S7, and S9. Each of the segments may correspond to a server.

Each of the VTEPs, for example, VTEP-A, VTEP-B, VTEP-C, and VTEP-D, and at least one segment may be implemented and connected to each other in a layer 2 (L2) network. Each of the VTEPs, for example, VTEP-A, VTEP-B, VTEP-C, and VTEP-D, may communicate with at least one segment via the L2 network.

Packet transmission and reception among the VTEPs may be performed via a layer 3 (L3) network. The packet transmission and reception among the VTEPs may be performed via at least one router 130. Among the at least one router 130, a router 130-1 may correspond to a rendezvous point (RP) in packet transmission and reception through multicasting.

VTEP-A may include a hypervisor 110-1 operating as a VTEP, and VTEP-D may include a hypervisor 110-2 operating as a VTEP. Each of the hypervisors 110-1 and 110-2 may correspond to a logical platform to be used to execute at least one operating system (OS) in a host computer. For example, each of the hypervisors 110-1 and 110-2 may correspond to a virtual machine monitor (VMM). The hypervisors 110-1 and 110-2 may correspond to VTEP-A and VTEP-D, respectively.

VTEP-B may include a top of rack (TOR) switch 120-1 operating as a VTEP, and VTEP-C may include a TOR switch 120-2 operating as a VTEP. The TOR switches 120-1 and 120-2 may correspond to VTEP-B and VTEP-C, respectively.

A representative VTEP may be selected from among the plurality of VTEPs, for example, VTEP-A, VTEP-B, VTEP-C, and VTEP-D, included in the system 100. Among the VTEPs, for example, VTEP-A, VTEP-B, VTEP-C, and VTEP-D, remaining VTEPs other than the representative VTEP may correspond to member VTEPs.

The selected representative VTEP may manage states of the remaining VTEPs. The representative VTEP may be determined arbitrarily or determined by a system manager. The representative VTEP may manage the states of the member VTEPs. The states of the member VTEPs may correspond to states of segments connected to the member VTEPs.

The representative VTEP may transmit a ping packet to each of the member VTEPs, and receive a response ping packet from each of the member VTEPs in response to the transmitted ping packet. The representative VTEP may identify a state of each member VTEP by processing the response ping packet received from each of the member VTEPs, and update information on the state of each member VTEP. The information on the state of each member VTEP may correspond to information on a state of at least one segment connected to each member VTEP.

Each of the member VTEPs may manage states of other VTEPs.

A member VTEP may receive a ping packet from the representative VTEP, identify a state of the representative VTEP by processing the received ping packet, and update information on the state of the representative VTEP. In addition, the member VTEP may receive a ping packet from each of the other member VTEPs, identify a state of each of the other member VTEPs by processing the received ping packet, and update information on the state of each of the other member VTEPs.

The packet transmission and reception among the VTEPs described above may be performed through a multicast tunnel.

Hereinafter, the term "TEP" used throughout the specification may correspond to the term "VTEP". Thus, the terms "TEP" and "VTEP" may be used interchangeably.

A method of a representative VTEP and a member VTEP managing other VTEPs will be described in detail with reference to FIGS. 2 through 12.

Figure 2:
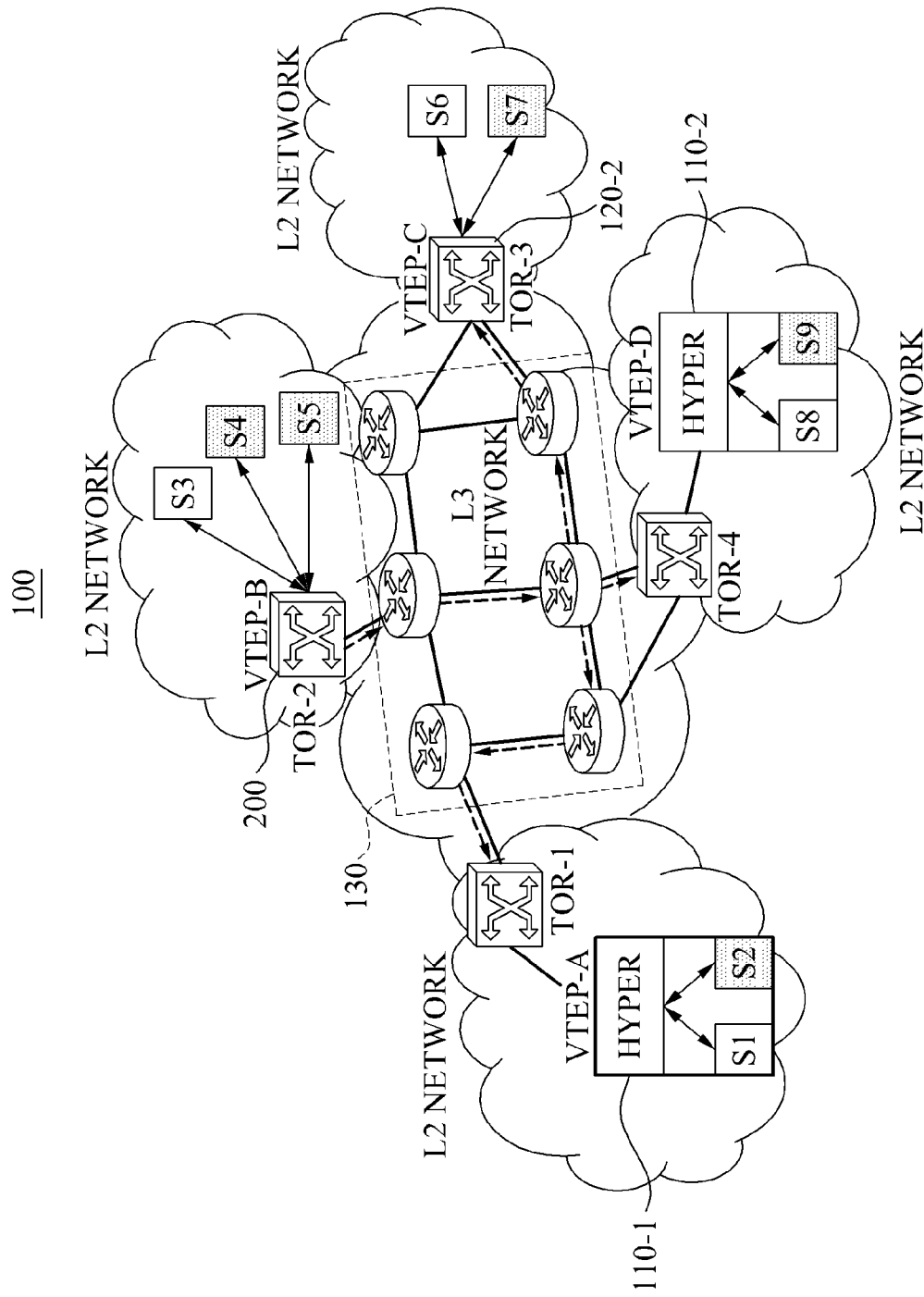
FIG. 2 is a diagram illustrating packet transmission from a representative TEP to member TEPs according to an embodiment of the present invention.

FIG. 2 is a diagram illustrating packet transmission from a representative TEP to member TEPs according to an embodiment of the present invention.

In FIG. 2, the system 100 of FIG. 1 including the four VTEPs, for example, VTEP-A, VTEP-B, VTEP-C, and VTEP-D, is illustrated.

Referring to FIG. 2, VTEP-B may be selected as a representative VTEP 200 in the system 100. Among the segments S1 through S9, the segments S1, S3, S6, and S8 may have a VNI differing from a VNI of the segments S2, S4, S5, S7, and S9.

The representative VTEP 200 may transmit a ping packet to VTEP-A, VTEP-C, and VTEP-D through a multicast tree. Each of VTEP-A, VTEP-C, and VTEP-D may correspond to a member VTEP. A member VTEP receiving the ping packet may transfer the received ping packet to at least one segment connected to the member VTEP.

The ping packet transmitted by the representative VTEP 200 may correspond to a VXLAN ping packet. A configuration and characteristics of the VXLAN ping packet may be in accord with IETF draft-jain-nvo3-vxlan-ping-00.

A message type of the ping packet transmitted by the representative VTEP 200 may correspond to a request type. For example, the message type of the ping packet may correspond to a VXLAN multiple echo request type.

The representative VTEP 200 may set a multicast address of the segments connected to the VTEPs, for example, VTEP-A, VTEP-B, VTEP-C, and VTEP-D, as a target Internet Protocol (IP) of the ping packet, and transmit the ping packet to the member VTEPs, for example, VTEP-A, VTEP-C, and VTEP-D, using the set target IP. A multicast address of segments may vary based on each VNI assigned to segments. For example, different multicast addresses may be assigned to the segments S1, S3, S6, and S8, and the segments S2, S4, S5, S7, and S9, respectively.

The representative VTEP 200 may generate the ping packet of the VXLAN multiple echo request type, and transmit the generated ping packet to the member VTEPs, for example, VTEP-A, VTEP-C, and VTEP-D, through the multicast tunnel.

The representative VTEP 200 may receive a response ping packet from each of the member VTEPs through the multicast tunnel in response to the transmitted ping packet. The received response ping packet may correspond to a VXLAN ping packet. A configuration and characteristics of the response ping packet may be in accord with IETF draft-fain-nvo3-vxlan-ping-00. The response ping packet may be a ping packet of which a message type corresponds to a response type. The response ping packet may correspond to a ping packet of a VXLAN multiple echo reply type.

The representative VTEP 200 may receive, from each of the member VTEPs through the multicast tunnel, the ping packet of the VXLAN multiple echo reply type as a response ping packet in response to the transmitted ping packet of the VXLAN multiple echo request type.

The representative VTEP 200 may manage the member VTEPs by updating information on a state of a member VTEP transmitting a response ping packet based on the received response ping packet. The representative VTEP 200 may manage the member VTEPs by updating information on a state of at least one segment connected to a member VTEP.

A member VTEP may identify the message type of the ping packet of the request type received from the representative VTEP 200 and message types of ping packets of the response type received from other member VTEPs, and transmit a response ping packet of the response type only in response to the ping packet of the request type received from the representative VTEP 200. The member VTEP may manage the representative VTEP 200 and the other member VTEPs by updating information on states of the representative VTEP 200 and the other member VTEPs based on the ping packet of the request type received from the representative VTEP 200 and the response ping packets of the response type received from the other member VTEPs.

A method of a representative VTEP and a member VTEP managing other VTEPs will be further described in detail with reference to FIGS. 3 through 12.

The technical descriptions provided with reference to FIG. 1 may be applied to FIG. 2 and thus, duplicated descriptions will be omitted for conciseness.

Figure 3:
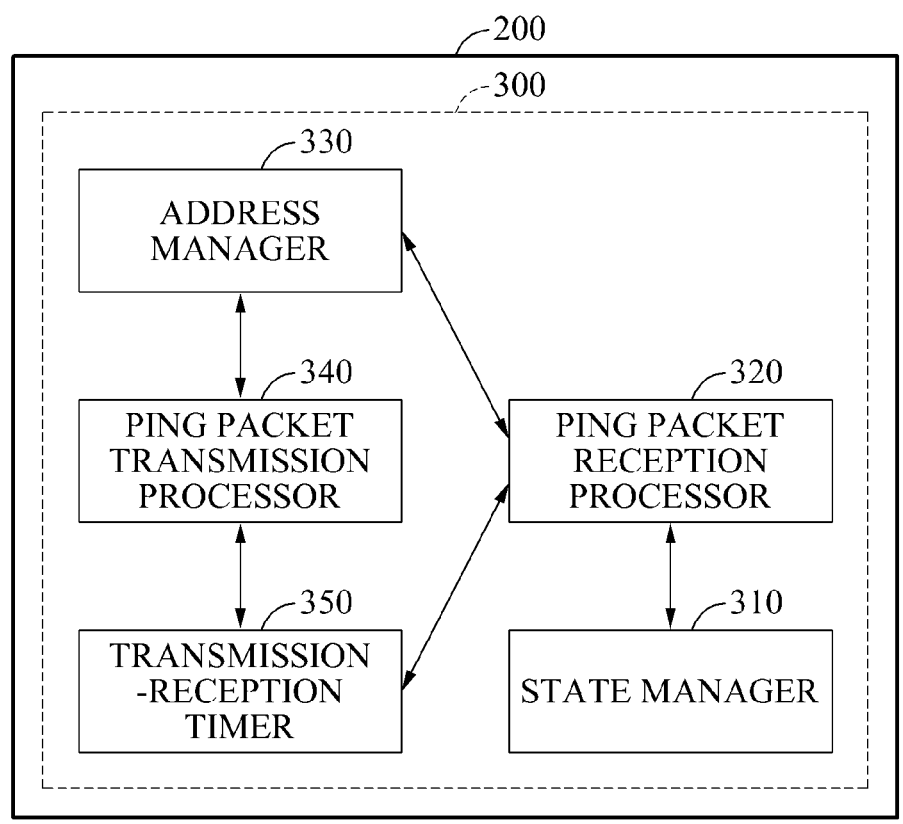
FIG. 3 is a block diagram illustrating a representative TEP according to an embodiment of the present invention.

FIG. 3 is a block diagram illustrating the representative TEP 200 according to an embodiment of the present invention.

In FIG. 3, a configuration of the representative (V)TEP 200 described with reference to FIGS. 1 and 2 is illustrated.

The representative TEP 200 may include a segment manager 300. Although the representative TEP 200 including a single segment manager 300 is illustrated, the segment manager 300 may be provided for each VNI assigned to the segments S1 through S9. For example, as described with reference to FIGS. 1 and 2, two segment managers 300 may be provided for the VNI of the segments S1, S3, S6, and S8, and the VNI of the segments S2, S4, S5, S7, and S9, respectively.

The segment manager 300 may include a state manager 310, a ping packet reception processor 320, an address manager 330, a ping packet transmission processor 340, and a transmission-reception timer 350.

The ping packet transmission processor 340 may determine a message type of a ping packet to be transmitted to each of the member TEPs, and generate the ping packet. The ping packet may include information on states of segments S3, S4, and S5 connected to the representative TEP 200.

The message type of the generated ping packet may correspond to a request type. For example, the message type of the generated ping packet may correspond to a VXLAN multiple echo request type.

The ping packet transmission processor 340 may set a multicast address of segments corresponding to an assigned VNI in the address manager 330 as a target IP of the ping packet to be transmitted to the member TEPs, and transmit the generated ping packet using the set target IP.

The ping packet reception processor 320 may receive a response ping packet in response to the ping packet transmitted to the member TEPs.

The state manager 310 may update information on a state of a VTEP corresponding to a source IP of the received response ping packet. The state manager 310 may update information on states of segments connected to the VTEP corresponding to the source IP of the response ping packet.

For example, the ping packet transmission processor 340 may transmit the ping packet to the member TEPs, for example, VTEP-A, VTEP-C, and VTEP-D, using a multicast address assigned to the segments S1, S3, S6, and S8 in the address manager 310 as a target IP. The ping packet reception processor 320 may receive the response ping packet including information on states of segments connected to each of the member TEPs, for example, VTEP-A, VTEP-C, and VTEP-D, from each of the member TEPs receiving the ping packet. The state manager 310 may manage the segments S1, S3, S6, and S8 by updating information on a state of at least one segment connected to a member TEP transmitting a response ping packet based on the received response ping packet.

A segment management method of the representative TEP 200 will be described in detail with reference to FIGS. 5 through 9.

The transmission-reception timer 350 may set a response time limit for reception of the response ping packet.

An operation of the transmission-reception timer 350 and the response time limit will be described in detail with reference to FIGS. 7 and 8.

The technical descriptions provided with reference to FIGS. 1 and 2 may be applied to FIG. 3 and thus, duplicated descriptions will be omitted for conciseness.

Figure 4:
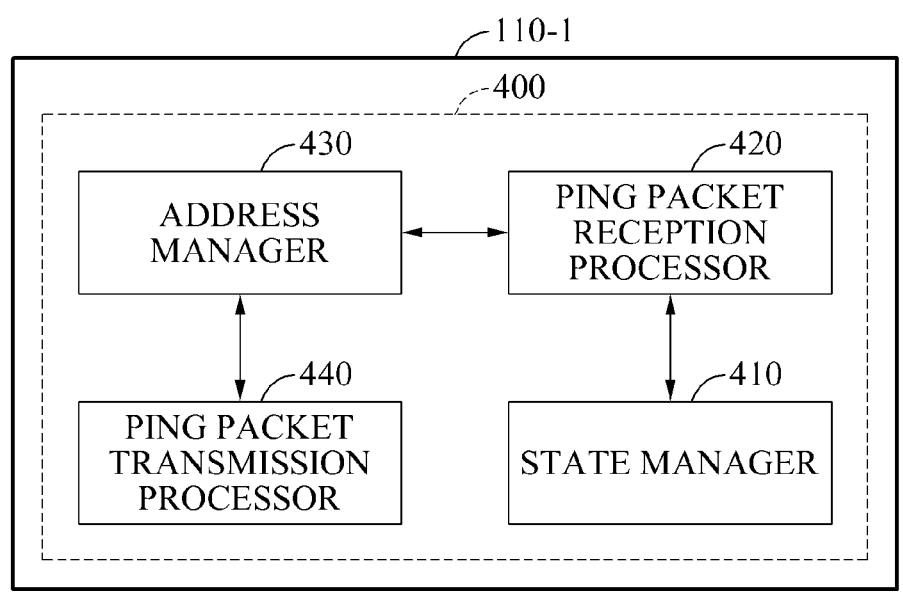
FIG. 4 is a block diagram illustrating a member TEP according to an embodiment of the present invention.

FIG. 4 is a block diagram illustrating the member TEP 110-1 according to an embodiment of the present invention.

In FIG. 4, a configuration of one of the member TEPs 110-1, 110-2, and 120-2 with respect to the representative TEP 200 is illustrated. Although only a configuration of the member TEP 110-1 is illustrated, the other member TEPs 110-2 and 120-2 may also have the same configurations.

Constituent elements of the member TEP 110-1 may be identical to the constituent elements of the representative TEP 200 described with reference to FIG. 3. In another example, as shown in FIG. 4, the member TEP 110-1 may not include the transmission-reception timer 350, unlike the representative TEP 200.

The member TEP 110-1 may include a segment manager 400 for each VNI assigned to the segments S1 through S9. The segment manager 400 may include a state manager 410, a ping packet reception processor 420, an address manager 430, and a ping packet transmission processor 440.

The descriptions on the state manager 310, the ping packet reception processor 320, the address manager 330, and the ping packet transmission processor 340 provided with reference to FIG. 3 may be applied to the state manger 410, the ping packet reception processor 420, the address manager 430, and the ping packet transmission processor 440 and thus, duplicated descriptions will be omitted for conciseness.

The ping packet reception processor 420 may receive a response ping packet from another member TEP, and receive a ping packet from the representative TEP 200. The state manager 410 may update information on a state of a TEP corresponding to a source IP of the received ping packet and/or the received response ping packet.

A message type of the ping packet received by the ping packet reception processor 420 may differ from a message type of the response ping packet received by the ping packet reception processor 420. The ping packet reception processor 420 may identify the message type of the ping packet, and the message type of the response ping packet.

The ping packet transmission processor 440 may transmit a response ping packet only when the identified message type corresponds to a request type. When the identified message type corresponds to a request type, the ping packet transmission processor 440 may set a target IP of the received ping packet as a target IP of the response ping packet, and transmit the response ping packet using the set target IP. The message type of the response ping packet to be transmitted may correspond to a response type. The response ping packet to be transmitted by the ping packet transmission processor 440 may include information on a state of at least one segment connected to the member TEP 110-1.

For example, the ping packet reception processor 420 may receive a ping packet of a request type from the representative TEP 200. The ping packet transmission processor 440 may transmit a response ping packet to the TEPs, for example, VTEP-B, VTEP-C, and VTEP-D, using a multicast address of the segments S1, S3, S6, and S8 as a target IP of the response ping packet. The multicast address of the segments S1, S3, S6, and S8 may correspond to a target IP address of the received ping packet. A segment management method of the member TEP 110-1 will be described in detail with reference to FIGS. 10 through 12.

The technical descriptions provided with reference to FIGS. 1 through 3 may be applied to FIG. 4 and thus, duplicated descriptions will be omitted for conciseness.

Figure 5:
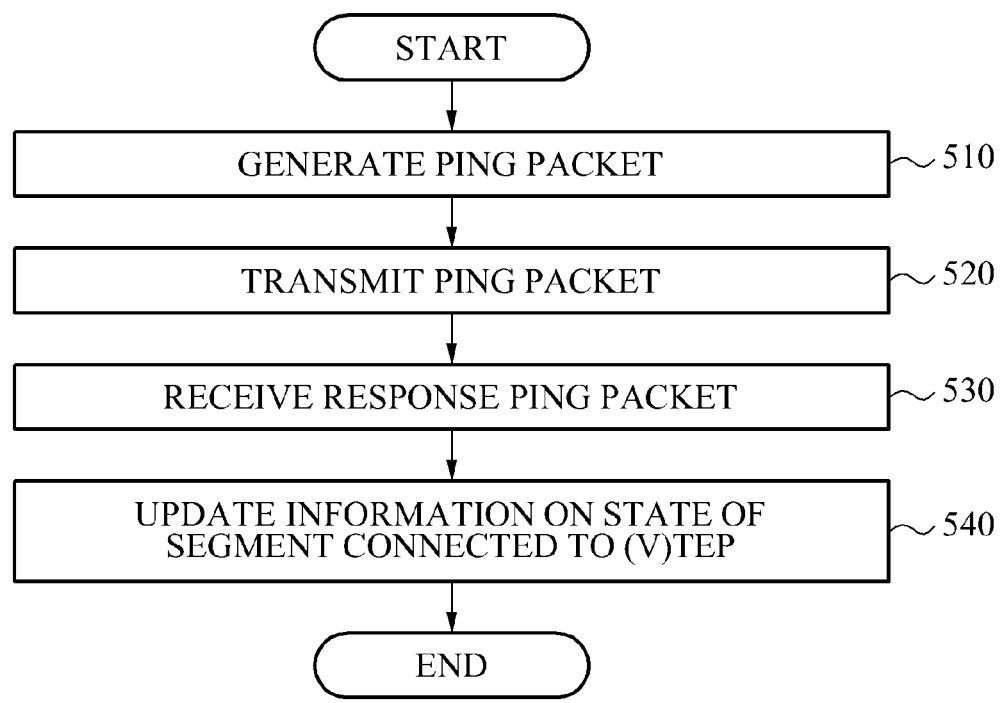
FIG. 5 is a flowchart illustrating a segment management method according to an embodiment of the present invention.

FIG. 5 is a flowchart illustrating a segment management method according to an embodiment of the present invention.

In FIG. 5, a method of the representative TEP 200 of FIG. 3 managing the segments S1 through S9 of the system 100 is illustrated.

In the following descriptions of operations 510 through 540, a TEP other than a representative TEP may correspond to the member TEP described with reference to FIGS. 1 through 4.

In operation 510, the ping packet transmission processor 340 may generate a ping packet. The ping packet may include information regarding whether a state of at least one segment connected to the representative TEP 200 is normal. The ping packet transmission processor 340 may generate the ping packet at a predetermined time interval. For example, the ping packet transmission processor 340 may generate the ping packet at the predetermined time interval by receiving, from the at least one segment, information regarding whether the state of the at least one segment is normal at the predetermined time interval.

A message type of the generated ping packet may correspond to a request type. For example, the message type of the generated ping packet may correspond to a VXLAN multiple echo request type.

In operation 520, the ping packet transmission processor 340 may transmit the ping packet generated in operation 510 to at least one TEP. The ping packet transmission processor 340 may transmit the ping packet to the at least one TEP through a multicast tunnel.

A method of the ping packet transmission processor 340 transmitting a ping packet to member TEPs will be described in detail with reference to FIG. 6.

In operation 530, the ping packet reception processor 320 may receive a response ping packet from each of the at least one TEP receiving the ping packet in response to the ping packet transmitted in operation 520. The response ping packet may include information on a state of a TEP transmitting the response ping packet. For example, the response ping packet received from each of the at least one TEP may include information regarding whether a state of at least one segment connected to each of the at least one TEP is normal. The information regarding whether the state of the at least one segment is normal may include at least one of information regarding whether the at least one segment operates normally, information on a usage state of the at least one segment, and information related to an error occurrence of the at least one segment.

A message type of the response ping packet may correspond to a response type. For example, the message type of the response ping packet may correspond to a VXLAN multiple echo reply type.

The message type of the ping packet may differ from the message type of the response ping packet.

A method of the ping packet reception processor 320 receiving a response ping packet will be described in detail with reference to FIGS. 7 and 8.

Operation 520 of transmitting the ping packet and operation 530 of receiving the response ping packet may be iteratively performed each time the ping packet is generated at the predetermined time interval in operation 510.

In operation 540, the state manager 310 may update information on a state of at least one segment connected to each of the at least one TEP transmitting the response ping packet based on the response ping packet received from each of the at least one TEP. Through the reception of the response ping packet from each of the at least one TEP at the predetermined time interval, the state manager 310 may update the information on the state of the at least one segment connected to each of the at least one TEP based on the response ping packet received at the predetermined time interval. Through the updating of the information on the state of the at least one segment, the representative TEP 200 may manage segments connected to the representative TEP 200 and segments connected to the member TEPs.

A method of the state manager 310 updating the information on a state of a TEP will be described in detail with reference to FIG. 9.

The technical descriptions provided with reference to FIGS. 1 through 4 may be applied to FIG. 5 and thus, duplicated descriptions will be omitted for conciseness.

Figure 6:
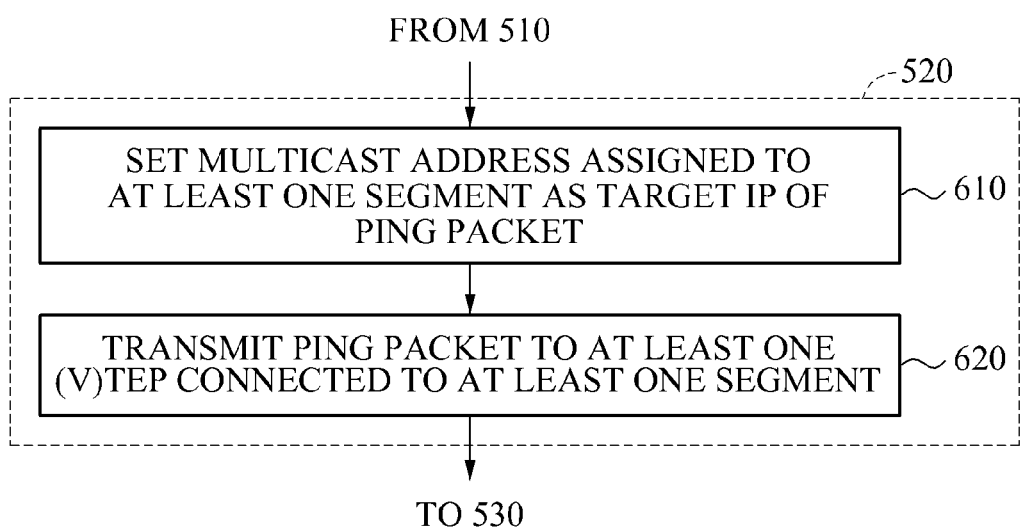
FIG. 6 is a flowchart illustrating a method of transmitting a ping packet to member TEPs according to an embodiment of the present invention.

FIG. 6 is a flowchart illustrating a method of transmitting a ping packet to member TEPs according to an embodiment of the present invention.

In operation 520 of FIG. 5, the ping packet transmission processor 340 may transmit the ping packet generated in operation 510 to at least one TEP. Operation 520 may include operations 610 and 620.

In operation 610, the ping packet transmission processor 340 may set, as a target IP of the ping packet, a multicast address assigned to at least one segment connected to at least one TEP, to which the ping packet is to be transmitted, in the address manager 330. The assigned multicast address in the address manager 330 may correspond to a multicast address of segments having a predetermined VNI. For example, when the segment manger 300 of FIG. 3 is configured to manage the segments S1, S3, S6, and S8, the assigned multicast address in the address manager 330 may correspond to a multicast address of the segments S1, S3, S6, and S8.

In operation 620, the ping packet transmission processor 340 may transmit the ping packet to the at least one TEP connected to at least one segment indicated by the target IP set in operation 610 through a multicast tunnel using the set target IP. For example, when the multicast address set in operation 610 corresponds to the multicast address of the segments S1, S3, S6, and S8, the ping packet transmission processor 340 may transmit the ping packet to the member TEPs, for example, VTEP-A, VTEP-C, and VTEP-D, connected to the segments S1, S6, and S8.

In operation 530, the ping packet reception processor 320 may receive a response ping packet from each of the at least one TEP connected to the at least one segment indicated by the set multicast address through the multicast tunnel. The multicast address corresponding to the target IP of the ping packet transmitted in operation 610 may be used as a target IP of the response ping packet. The target IP of the ping packet and the target IP of the response ping packet may be identical multicast addresses.

A method of a member TEP transmitting a response ping packet will be described in detail with reference to FIGS. 10 and 11.

The technical descriptions provided with reference to FIGS. 1 through 5 may be applied to FIG. 6 and thus, duplicated descriptions will be omitted for conciseness.

Figure 7:
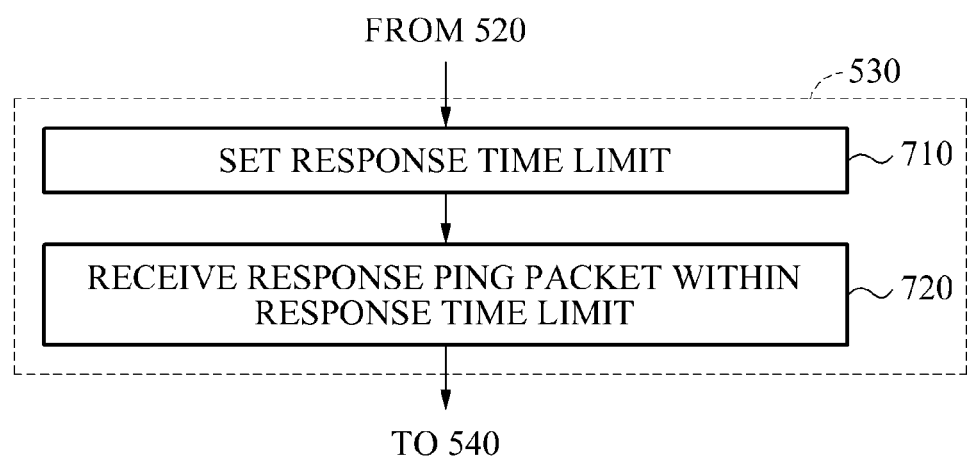
FIG. 7 is a flowchart illustrating a method of receiving a response ping packet according to an embodiment of the present invention.

FIG. 7 is a flowchart illustrating a method of receiving a response ping packet according to an embodiment of the present invention.

In operation 530 of FIG. 5, the ping packet reception processor 320 may sequentially receive a response ping packet from each of at least one TEP receiving a ping packet transmitted in operation 520, in response to the transmitted ping packet. Operation 530 may include operations 710 and 720.

In operation 710, the transmission-reception timer 350 may set a response time limit for reception of the response ping packet of the ping packet reception processor 320. The response time limit may be set to vary based on a state of the representative TEP 200 and/or states of the member TEPs. For example, the response time limit may be determined based on at least one of information regarding whether at least one segment connected to the representative TEP 200 and/or the member TEPs operates normally, information on a usage state of the at least one segment, and information related to an error occurrence of the at least one segment.

In operation 720, the ping packet reception processor 320 may receive a response ping packet from each TEP within the set response time limit. For example, the ping packet reception processor 320 may wait to receive the response ping packet until the set response time limit expires. When a response ping packet is received during the waiting, the ping packet reception processor 320 may wait until a residual response time limit expires, or may receive a new response ping packet.

A method of the ping packet reception processor 320 receiving a response ping packet from a TEP within a set response time limit will be described in detail with reference to FIG. 8.

The technical descriptions provided with reference to FIGS. 1 through 6 may be applied to FIG. 7 and thus, duplicated descriptions will be omitted for conciseness.

Figure 8:
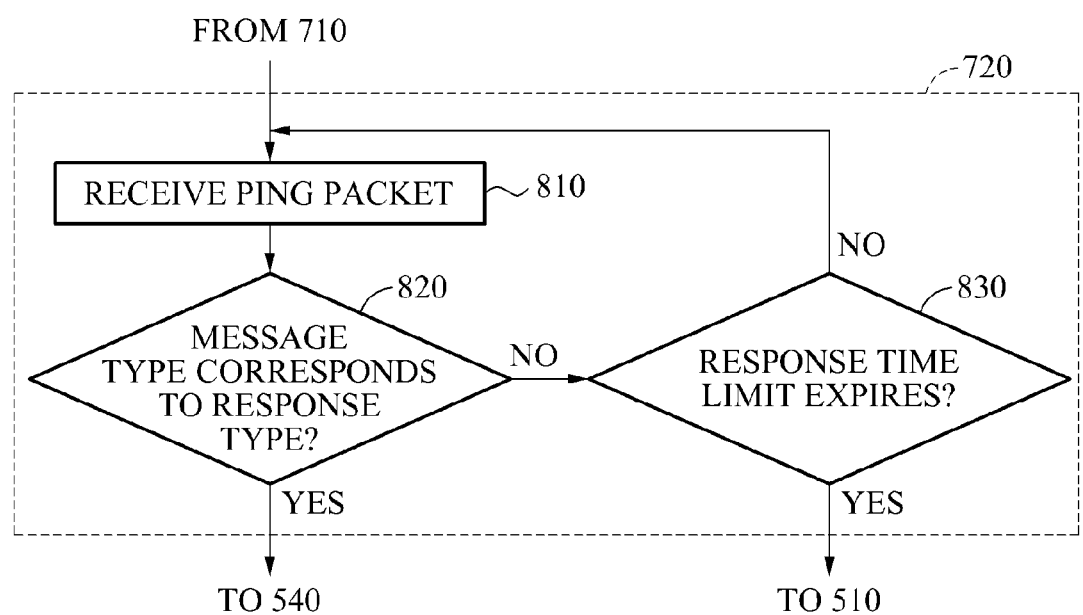
FIG. 8 is a flowchart illustrating a method of receiving a response ping packet according to another embodiment of the present invention.

FIG. 8 is a flowchart illustrating a method of receiving a response ping packet according to another embodiment of the present invention.

In operation 720 of FIG. 7, the ping packet reception processor 320 may receive a response ping packet from each TEP within a set response time limit Operation 720 may include operations 810 through 830.

In operation 810, the ping packet reception processor 320 may receive a ping packet within a response time limit. The ping packet received by the ping packet reception processor 320 within the response time limit may correspond to a response ping packet and/or a ping packet other than a response ping packet.

In operation 820, the ping packet reception processor 320 may identify a message type of the received ping packet. For example, the ping packet reception processor 320 may verify whether the received ping packet corresponds to a response ping packet by identifying the message type of the received ping packet.

When the message type of the received ping packet corresponds to a response type, operation 540 of FIG. 5 may be performed. In this example, the ping packet received by the ping packet reception processor 320 may correspond to a response ping packet, and the state manager 310 may update information on a state of at least one segment connected to a member TEP transmitting the response ping packet.

Conversely, when the message type of the received ping packet does not correspond to a response type, the ping packet reception processor 320 may determine whether the response time limit set by the transmission-reception timer 350 expires, in operation 830. When the set response time limit is yet to expire, the ping packet reception processor 320 may return to operation 810 to receive a ping packet. Conversely, when the set response time limit expires, the ping packet reception processor 320 may terminate reception of a response ping packet, and return to operation 510 of FIG. 5 to generate a ping packet.

The technical descriptions provided with reference to FIGS. 1 through 7 may be applied to FIG. 8 and thus, duplicated descriptions will be omitted for conciseness.

Figure 9:
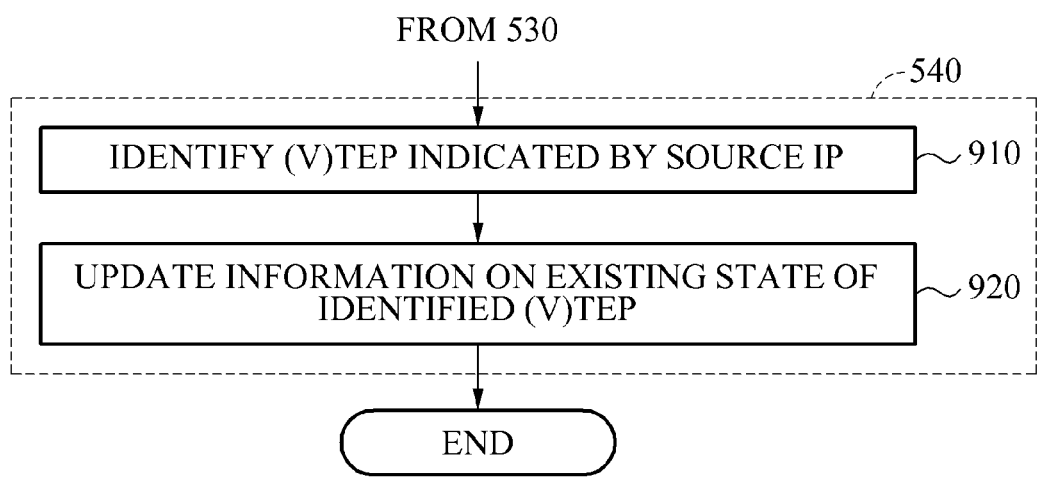
FIG. 9 is a flowchart illustrating a method of updating information on a state of at least one segment according to an embodiment of the present invention.

FIG. 9 is a flowchart illustrating a method of updating information on a state of at least one segment according to an embodiment of the present invention.

In operation 540 of FIG. 5, the state manager 310 may update information on a state of at least one segment connected to each of at least one TEP transmitting a response ping packet based on the response ping packet received from each TEP. Operation 540 may include operations 910 and 920.

In operation 910, the ping packet reception processor 320 may identify a TEP indicated by a source IP of a received response ping packet, among at least one TEP transmitting the response ping packet.

In operation 920, the state manager 310 may update information on an existing state of the TEP identified in operation 910. The existing state of the identified TEP to be updated may correspond to an existing state of at least one segment connected to the identified TEP. For example, the state manager 310 may update at least one of information regarding whether the at least one segment connected to the identified TEP operates normally, information on a usage state of the at least one segment, and information related to an error occurrence of the at least one segment.

The technical descriptions provided with reference to FIGS. 1 through 8 may be applied to FIG. 9 and thus, duplicated descriptions will be omitted for conciseness.

Figure 10:
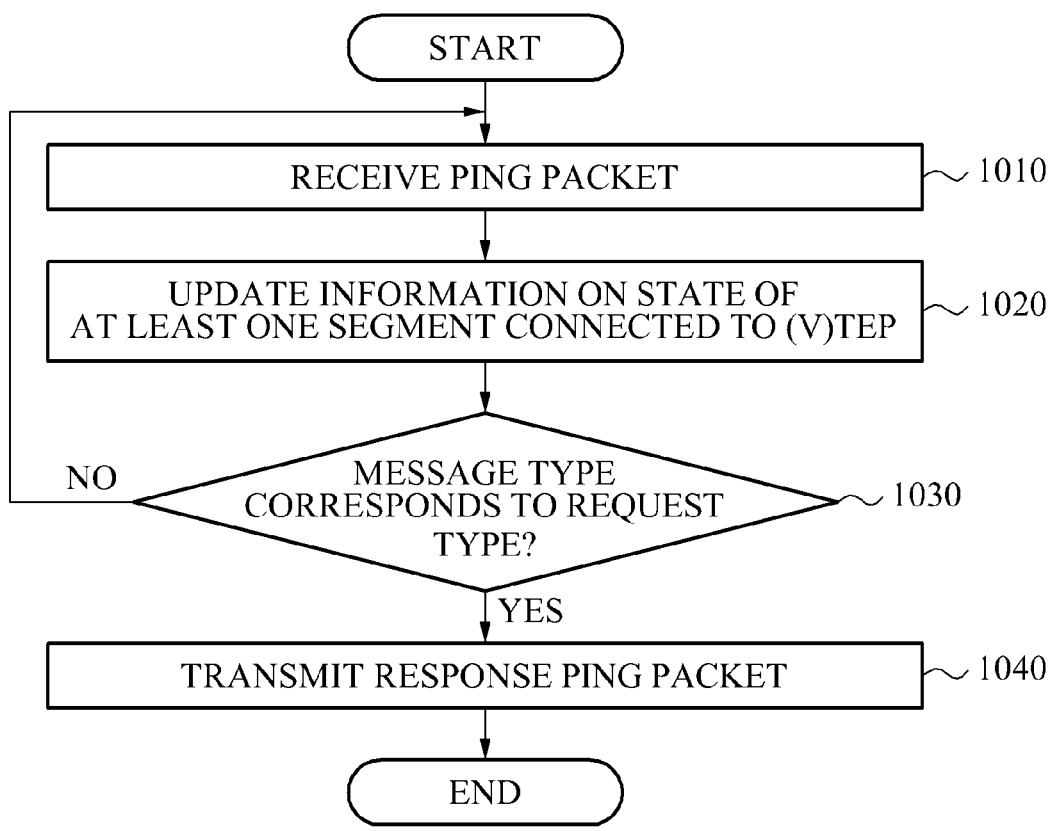
FIG. 10 is a flowchart illustrating a segment management method according to another embodiment of the present invention.

FIG. 10 is a flowchart illustrating a segment management method according to another embodiment of the present invention.

In FIG. 10, a method of the member TEP 110-1 of FIG. 4 managing the segments S1 through S9 of the system 100 is illustrated.

In operation 1010, the ping packet reception processor 420 may receive a ping packet. The ping packet received by the ping packet reception processor 420 may correspond to a ping packet transmitted from the representative TEP 200 or a response ping packet transmitted from another member TEP.

The ping packet reception processor 420 may receive the ping packet at a predetermined time interval. For example, the predetermined time interval at which the ping packet reception processor 420 receives a ping packet from the representative TEP 200 may be determined based on a predetermined time interval at which the ping packet is generated by the representative TEP.

The ping packet reception processor 420 may receive a ping packet from another TEP through a multicast tunnel. A target IP of the ping packet transmitted to the ping packet reception processor 420 may correspond to a multicast address of at least one segment connected to the member TEP 110-1.

The ping packet received by the ping packet reception processor 420 may include information regarding whether a state of at least one segment connected to the other TEP transmitting the ping packet is normal.

In operation 1020, the state manager 410 may update, based on the received ping packet, the information on the state of the at least one segment connected to the other TEP indicated by a source IP of the received ping packet. For example, when the received ping packet corresponds to a ping packet transmitted from the representative TEP 200, the state manager 410 may update information on a state of at least one segment connected to the representative TEP 200. When the received ping packet corresponds to a response ping packet transmitted from another member TEP, the state manager 410 may update information on a state of at least one segment connected to the other member TEP.

By updating information on a state of at least one segment connected to another TEP, the member TEP 110-1 may manage segments connected to the member TEP 110-1 and other TEPs.

A method of the state manager 410 updating information on a state of another TEP will be described in detail with reference to FIG. 12.

In operation 1030, the ping packet reception processor 420 may identify a message type of the received ping packet. For example, the ping packet reception processor 420 may identify a message type of the ping packet transmitted from the representative TEP 200 as a request type, and identify a message type of a response ping packet transmitted from another member TEP as a response type. The message type of the response ping packet may correspond to the response type differing from the request type.

When the message type of the received ping packet does not correspond to a request type, the ping packet reception processor 420 may return to operation 1010 to receive a ping packet.

When the message type of the received ping packet corresponds to a request type, the ping packet transmission processor 440 may transmit a response ping packet to another TEP transmitting the ping packet in response to the received ping packet, in operation 1040. In this example, the other TEP may correspond to the representative TEP 200.

The response ping packet may include information regarding whether a state of the at least one segment connected to the member TEP 110-1 is normal. The packet transmission processor 440 may generate the response ping packet including the information regarding whether the state of the at least one segment connected to the member TEP 110-1 is normal, and transmit the generated response ping packet to another TEP transmitting the ping packet. The other TEP transmitting the ping packet to the ping packet reception processor 420 may correspond to the representative TEP 200.

When the ping packet transmission processor 440 transmits the response ping packet through a multicast tunnel, the response ping packet may be transmitted to the representative TEP 200 and also to other member TEPs. The response ping packet may be transmitted to the representative TEP 200 connected to at least one segment indicated by a multicast address corresponding to a target IP of the response ping packet, and/or the other member TEPs.

A method of the ping packet transmission processor 440 transmitting a response ping packet will be described in detail with reference to FIG. 11.

The technical descriptions provided with reference to FIGS. 1 through 9 may be applied to FIG. 10 and thus, duplicated descriptions will be omitted for conciseness.

Figure 11:
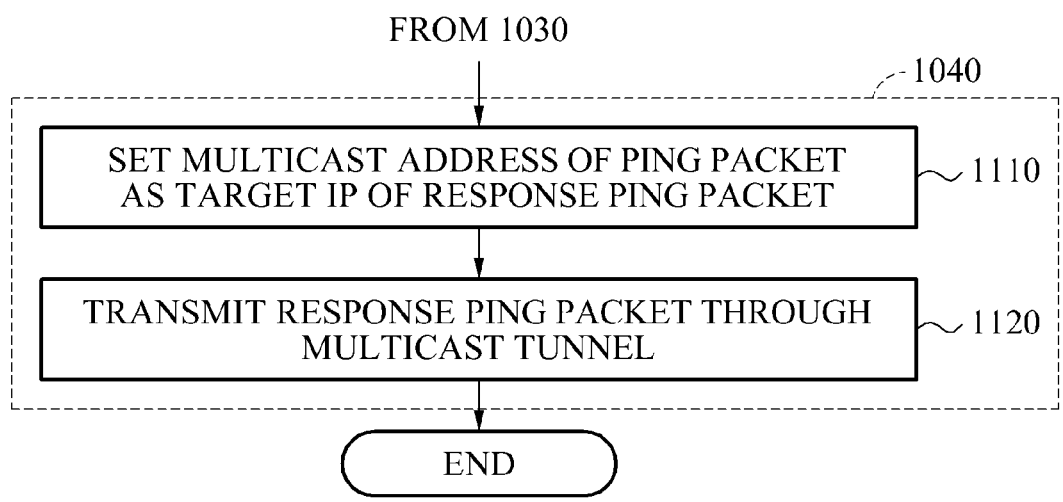
FIG. 11 is a flowchart illustrating a method of transmitting a response ping packet according to an embodiment of the present invention.

FIG. 11 is a flowchart illustrating a method of transmitting a response ping packet according to an embodiment of the present invention.

In operation 1040 of FIG. 10, the ping packet transmission processor 440 may transmit a response ping packet to another TEP transmitting a ping packet in response to the received ping packet. Operation 1040 may include operations 1110 and 1120.

In operation 1110, the ping packet transmission processor 440 may set a multicast address of a ping packet received by the ping packet reception processor 420 as a target IP of a response ping packet. A target IP of the ping packet received by the ping packet reception processor 420 may be identical to the target IP of the response ping packet.

In operation 1120, the ping packet transmission processor 440 may transmit the response ping packet to another TEP transmitting the ping packet through a multicast tunnel using the target IP set in operation 1110. The response ping packet may be transmitted to at least one TEP connected to at least one segment indicated by the target IP through the multicast tunnel. Thus, the response ping packet may be transmitted to the representative TEP 200 transmitting the ping packet and other member TEPs.

For example, when the target IP of the ping packet received by the ping packet reception processor 420 corresponds to a multicast address of segments S1, S3, S6, and S8, the ping packet transmission processor 440 may set the multicast address of the segments S1, S3, S6, and S8 as the target IP of the response ping packet, and transmit the response ping packet to the representative TEP 200 and member TEPs, for example, VTEP-C and VTEP-D, connected to segments S3, S6, and S8.

The technical descriptions provided with reference to FIGS. 1 through 10 may be applied to FIG. 11 and thus, duplicated descriptions will be omitted for conciseness.

Figure 12:
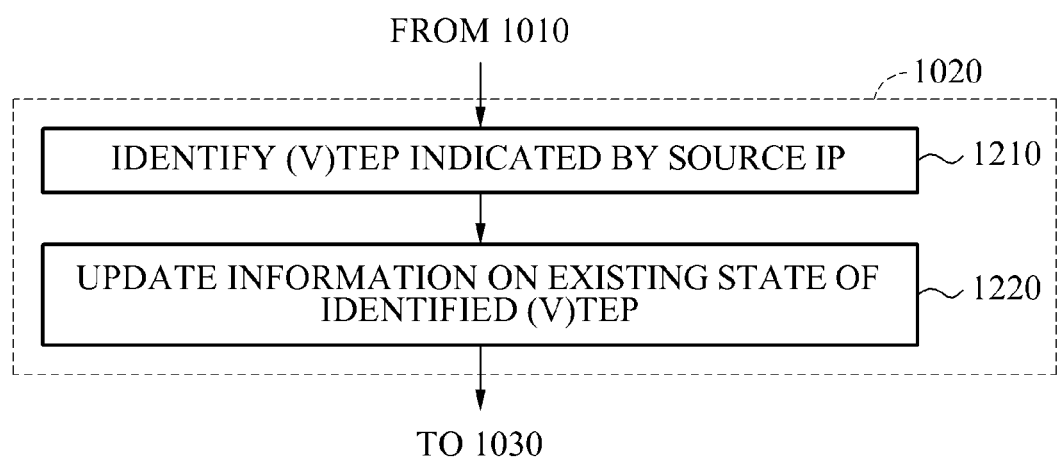
FIG. 12 is a flowchart illustrating a method of updating information on a state of a TEP according to an embodiment of the present invention.

FIG. 12 is a flowchart illustrating a method of updating information on a state of a TEP according to an embodiment of the present invention.

In operation 1020 of FIG. 10, the state manager 410 may update, based on a received response ping packet, information on a state of at least one segment connected to another TEP indicated by a source IP of a received ping packet. Operation 1020 may include operations 1210 and 1220.

In operation 1210, the ping packet reception processor 420 may identify another TEP indicated by a source IP of a received ping packet.

In operation 1220, the state manager 410 may update information on an existing state of the other TEP identified in operation 1210. The existing state of the identified other TEP to be updated may correspond to an existing state of at least one segment connected to the identified other TEP. For example, the state manger 410 may update at least one of information regarding whether the at least one segment connected to the identified other TEP operates normally, information on a usage state of the at least one segment, and information related to an error occurrence of the at least one segment.

The technical descriptions provided with reference to FIGS. 1 through 11 may be applied to FIG. 12 and thus, duplicated descriptions will be omitted for conciseness.

According to embodiments of the present invention, it is possible to provide a method and apparatus for managing segments that may not require a separate unicast tunnel by transmitting a ping packet from a representative TEP, selected from among a plurality of TEPs, to member TEPs and receiving response ping packets from the member TEPs to the representative TEP through multicasting.

According to embodiments of the present invention, it is possible to provide a method and apparatus for manage segments that may considerably reduce a burden to a layer 3 (L3) network by performing transmission and reception of a ping packet and a response ping packet through an identical multicast tunnel.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of managing a segment, the method performed by a tunnel end point (TEP) selected from among a plurality of TEPs as a representative TEP, the method comprising:
generating a ping packet;
transmitting the generated ping packet to at least one TEP connected to the representative TEP via a network;
receiving a response ping packet from each of the at least one TEP in response to the transmitted ping packet; and
updating information on a state of at least one segment connected to each of the at least one TEP based on the received response ping packet,
wherein the at least one segment is a server that has a multicast address and connects to a TEP via a Layer 2 (L2) network.

2. The method of claim 1, wherein the generating comprises generating the ping packet at a predetermined time interval, and the transmitting and the receiving are iteratively performed each time the ping packet is generated at the predetermined time interval.

3. The method of claim 1, wherein the transmitting comprises:
setting a multicast address assigned to the at least one segment as a target Internet Protocol (IP) of the ping packet; and
transmitting the ping packet to at least one TEP connected to the at least one segment through a multicast tunnel using the set target IP, and
the receiving comprises receiving a respective response ping packet from each of the at least one TEP connected to the at least one segment through the multicast tunnel, wherein the multicast address is used as a target IP of the response ping packet.

4. The method of claim 1, wherein the received response ping packet comprises information regarding whether the state of the at least one segment connected to each of the at least one TEP is normal.

5. The method of claim 1, wherein the updating comprises: identifying a TEP indicated by a source IP of the received response ping packet, among the at least one TEP; and updating information on an existing state of the identified TEP.

6. The method of claim 1, wherein the receiving comprises sequentially receiving the response ping packet from each of the at least one TEP in response to the ping packet, and the receiving comprises:
setting a response time limit for reception of the response ping packet; and
receiving the response ping packet from each of the at least one TEP within the set response time limit.

7. The method of claim 1, wherein a message type of the ping packet differs from a message type of the response ping packet.

8. A method of managing a segment, the method performed by a tunnel end point (TEP), the method comprising:
receiving a ping packet from another TEP connected to the TEP via a network;
updating, based on the received response ping packet, information on a state of at least one segment connected to the other TEP indicated by a source Internet Protocol (IP) of the received ping packet; and
transmitting a response ping packet to the other TEP in response to the received ping packet when a message type of the received ping packet corresponds to a request type,
wherein the at least one segment is a server that has a multicast address and connects to a TEP via a Layer 2 (L2) network.

9. The method of claim 8, wherein the receiving comprises receiving the ping packet from the other TEP through a multicast tunnel.

10. The method of claim 9, wherein the transmitting comprises:
setting a multicast address of the received ping packet as a target IP of the response ping packet; and
transmitting the response ping packet to the other TEP through a multicast tunnel using the set target IP.

11. The method of claim 8, wherein the received ping packet comprises information regarding whether the state of the at least one segment connected to the other TEP is normal, and the response ping packet comprises information regarding whether a state of at least one segment connected to the TEP is normal.

12. The method of claim 8, wherein a message type of the response ping packet corresponds to a response type differing from the request type.

13. The method of claim 8, wherein the receiving comprises receiving the ping packet at a predetermined time interval.

14. The method of claim 8, wherein the updating comprises: identifying the other TEP indicated by the source IP of the received ping packet; and updating information on an existing state of the identified other TEP.

15. A tunnel end point (TEP) comprising:
a ping packet transmission processor to generate a ping packet and transmit the generated ping packet to at least one TEP connected to the TEP via a network;
a ping packet reception processor to transmit a response ping packet from each of the at least one TEP in response to the ping packet; and
a state manager to update information on a state of at least one segment connected to each of the at least one TEP based on the received response ping packet,
wherein the TEP is selected from among a plurality of TEPs as a representative TEP, and
wherein the at least one segment is a server that has a multicast address and connects to a TEP via a Layer 2 (L2) network.

16. The TEP of claim 15, further comprising:
an address manager,
wherein the ping packet transmission processor sets a multicast address assigned to the at least one segment in the address manager as a target Internet Protocol (IP) of the ping packet, and transmits the ping packet to at least one TEP connected to the at least one segment through a multicast tunnel using the set target IP, the ping packet reception processor receives a respective response ping packet from each of the at least one TEP connected to the at least one segment through the multicast tunnel, and the multicast address is used as a target IP of the response ping packet.

17. The TEP of claim 15, wherein the state manager identifies a TEP indicated by a source IP of the received response ping packet, among the at least one TEP, and updates information on an existing state of the identified TEP.

18. The TEP of claim 15, further comprising: a transmission-reception timer to determine a response time limit for reception of the response ping packet, wherein the ping packet reception processor sequentially receives the response ping packet from each of the at least one TEP in response to the ping packet, and receives the response ping packet from each of the at least one TEP within the determined response time limit.

* * * * *